United States Patent [19]

Flinta et al.

[11] Patent Number: 5,386,924
[45] Date of Patent: Feb. 7, 1995

[54] CAP FOR GAS OUTLET NOZZLES

[76] Inventors: Frank J. Flinta, 6099 Farmstead Ln., Mississauga, Ontario, Canada, L5N 2Z1; Garrey D. Green, 31 Georian Cres., Kitchener, Ontario, Canada, N2B 3N8

[21] Appl. No.: 240,524

[22] Filed: May 10, 1994

[51] Int. Cl.$^6$ ............................................. B65D 55/02
[52] U.S. Cl. ................................... 220/284; 220/210; 220/725; 215/207; 215/215
[58] Field of Search ............... 220/725, 210, 284, 730; 215/207, 215, 216, 225

[56] References Cited

U.S. PATENT DOCUMENTS

| | | | |
|---|---|---|---|
| 1,839,662 | 1/1932 | Fairchild | 220/210 X |
| 3,371,809 | 3/1968 | Pompa | 215/215 |
| 3,526,332 | 9/1970 | Adelberger | 215/207 |
| 3,801,454 | 4/1974 | Kumpf | 220/284 X |
| 4,119,239 | 10/1978 | Anderson | 220/324 |
| 4,257,561 | 3/1981 | McKinney | 215/216 X |
| 4,687,112 | 8/1987 | Swartzbaugh | 215/216 |

*Primary Examiner*—Allan N. Shoap
*Assistant Examiner*—Vanessa Caretto
*Attorney, Agent, or Firm*—Donald E. Hewson

[57] ABSTRACT

A cap member for fitment over a gas outlet nozzle having a plurality of serrations on the exterior thereof, is disclosed. The cap member comprises a peripherally disposed main body portion having an inner surface and an outer surface, the inner surface defining a nozzle receiving recess, an open first end, a generally closed second end, and a lock member. The lock member has a projecting lock portion movable between a first locking position and a second unlocking position. When the projecting lock portion is in the first locking position, the projecting lock portion projects into the nozzle receiving recess so as to be in interfering relation with one of the plurality of serrations on the exterior of the gas outlet nozzle, so as to thereby lock the cap member in place and preclude the cap member from being removed from the nozzle. When the projecting lock portion is in the second unlocking position, the projecting lock portion no longer projects into the nozzle receiving recess so as to no longer be in interfering relation with any of the plurality of serrations on the exterior of the gas outlet nozzle, so as to thereby permit the cap to be removed from the nozzle. The cap member further comprises an access passageway to permit access by a co-operating key member to the projecting lock portion of the lock member, to thereby allow the key member to contact and thereby move the projecting lock portion from its first locking position to its second unlocking position.

16 Claims, 3 Drawing Sheets

1

CAP FOR GAS OUTLET NOZZLES

FIELD OF THE INVENTION

This invention relates to gas outlet nozzles such as those used in laboratories or classrooms, and more particularly to caps for protecting the ends of such gas outlet nozzles and precluding foreign objects or matter from being inserted into the open end of such an outlet nozzle.

BACKGROUND OF THE INVENTION

Most modern laboratories and school science classrooms, among other science oriented facilities, have outlet nozzles for the controlled dispensing of a flow of natural gas into a burner apparatus, such as a bunsen burner. The actual nozzle outlet is elongated along a longitudinal axis, and is generally frustum shaped with the narrower diameter being at the outlet end. An orifice in the outlet end of the nozzle is in fluid communication with a source of natural (or other) gas so as to permit dispensing of the gas. Since these gas outlet nozzles are usually intended to feed a flow of gas at low pressures to a bunsen burner, which is connected to the nozzle using a flexible robber hose, the exterior of the nozzle has a plurality of serrations thereon to help keep the rubber hose retained thereon for delivery of the gas. Typically, at least in North America, the gas being supplied to laboratories and school science classrooms for use as fuel for bunsen burners is natural gas. However, there may be circumstances such as in remote districts, where manufactured or bottled gas is required to be used.

Typically, the serrations have a back face that is generally perpendicular to the longitudinal axis of the nozzle, and have a front face that is angled with respect to the longitudinal axis of the nozzle. Accordingly, it is relatively easy to slip a rubber hose onto the nozzle, but is more difficult to slip the robber hose off of the nozzle.

A problem exists with these types of nozzles, especially in schools, in that it is relatively easy to deposit foreign objects or matter, such as gum, candy wrappers, pencil stubs, etc., into the open end of a natural gas outlet nozzle. Further, it is also possible for small insect to enter the open end of nozzle, which is undesirable.

It is extremely difficult, and possibly dangerous, to remove such foreign objects and matter from the open end of the nozzle. It is especially dangerous, and contrary to safety code regulations, to use a drill or twist bit to remove the offending foreign matter from the interior of the nozzle. Typically, what is done presently is that the nozzle is replaced. However, replacement of this type of nozzle costs in the order of $50.00 per replacement, which is prohibitively expensive.

What is needed is means to preclude unwanted foreign objects or matter from entering or being otherwise deposited into the open end of a gas nozzle.

SUMMARY OF THE INVENTION

In accordance with one aspect of the present invention, there is provided a cap member for fitment over a gas outlet nozzle having a plurality of serrations on the exterior thereof. The cap member comprises a peripherally disposed main body portion having an inner surface and an outer surface, with the inner surface defining a nozzle receiving recess. There is an open first end, a generally closed second end, and a lock member mounted in operative relation to the main body portion, with the lock member having at least one projecting lock portion thereon. The lock member is moveable between a first locking position and a second unlocking position. When the cap member is in place on the gas outlet nozzle and the at least one projecting lock portion is in its first locking position, the at least one lock portion projects into the nozzle receiving recess so as to be in interfering relation with one of the plurality of serrations on the exterior of the gas outlet nozzle, so as to thereby lock the cap member in place and preclude the cap member from being removed from the nozzle. The cap member further comprises an access passageway in the peripherally disposed main body portion, which access passageway is shaped and dimensioned to removably receive a co-operating key member therein, so as to permit access by the key member to the at least one projecting lock portion of the lock member, to thereby allow the key member to contact and thereby move the at least one projecting lock portion from its first locking position to its second unlocking position.

BRIEF DESCRIPTION OF THE DRAWINGS

Embodiments of this invention will now be described by way of example in association with the accompanying drawings, in which.

DETAILED DESCRIPTION OF THE PREFERRED EMBODIMENTS

Reference will now be made to FIGS. 1 through 8 to describe the cap member 30 of the present invention, and to further describe how the cap member of the present invention fits over a gas outlet nozzle 20 and locks in place thereon.

Figure 1:
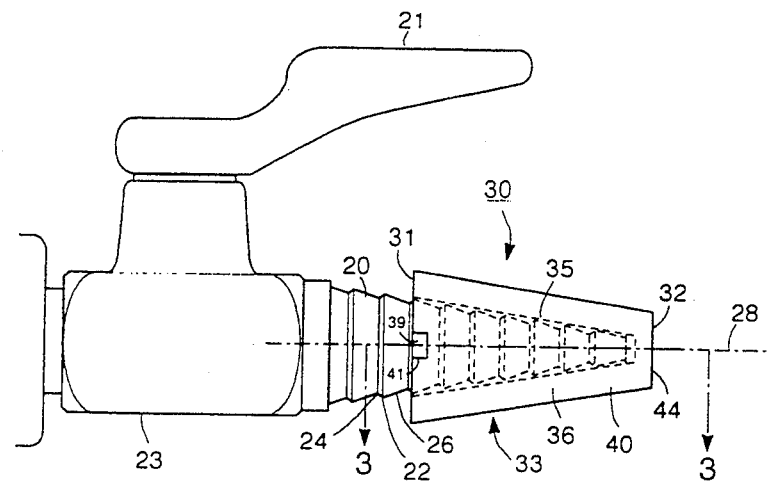
FIG. 1 is a side elevational view of the cap member of the present invention installed on a gas outlet nozzle.
Figure 2:
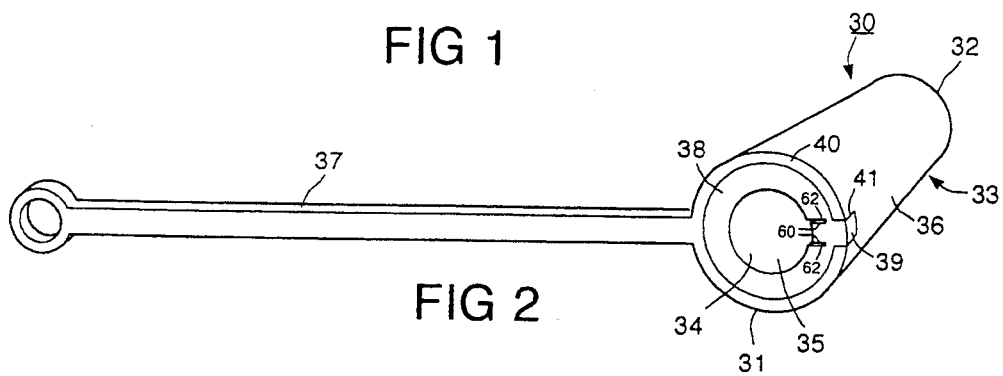
FIG. 2 is a perspective view of the cap member of FIG. 1.
Figure 3:
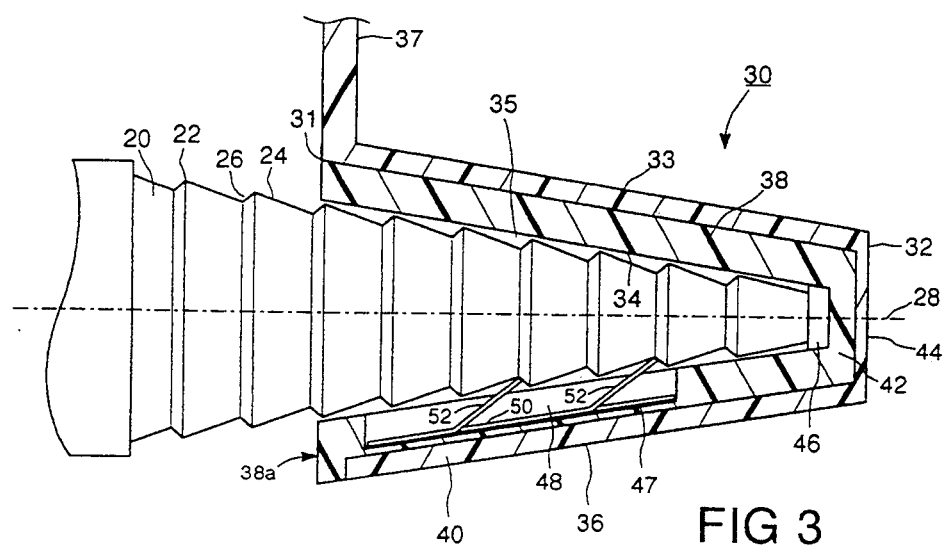
FIG. 3 is an enlarged scale top sectional view along section lines 3—3 of the cap member of the present invention installed on a gas outlet nozzle, as in FIG. 1.
Figure 4:
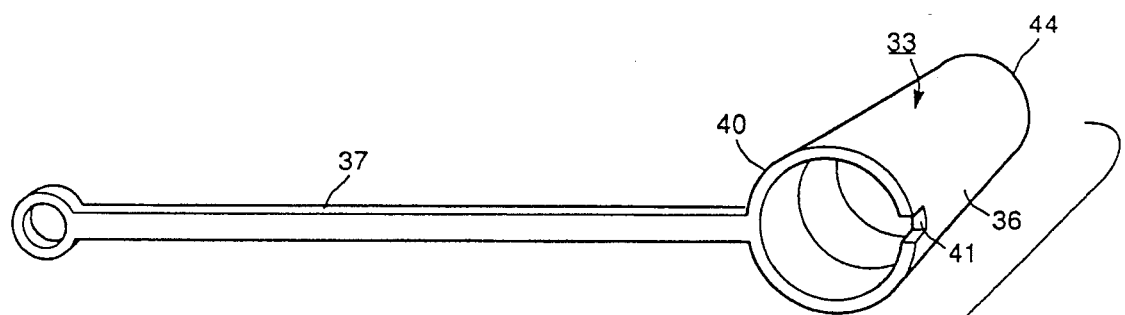
FIG. 4 is a an exploded perspective view of the cap member of the present invention.
Figure 5:
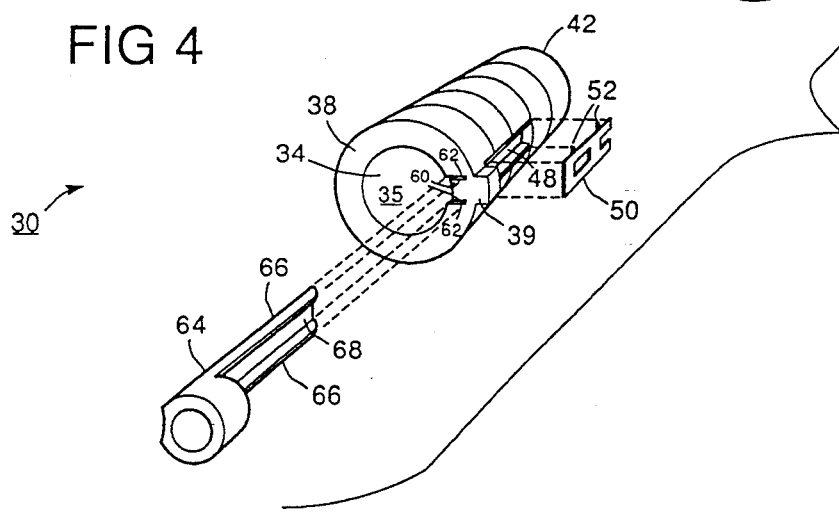
FIG. 5 is an enlarged scale end view of the cap member of the present invention showing the first end thereof.
Figure 5:
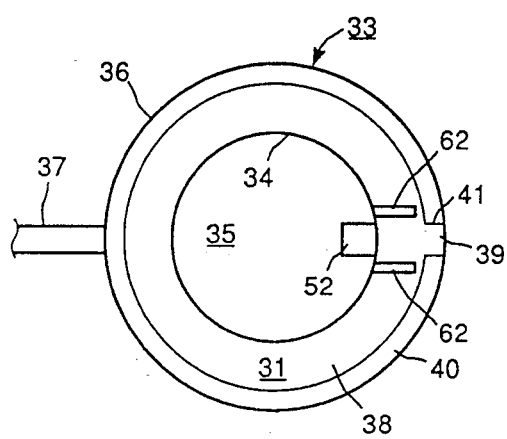
Figure 6:
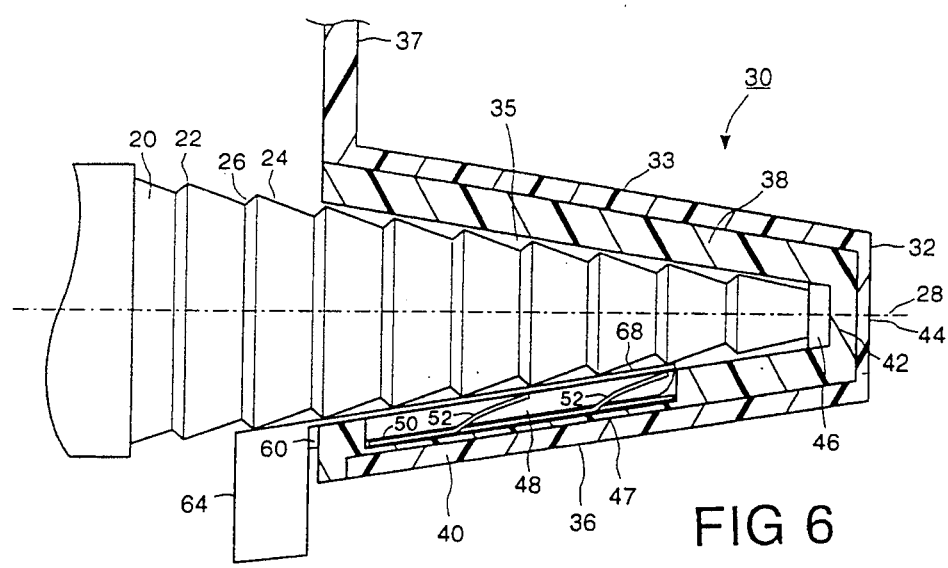
FIG. 6 is a top sectional view, similar to FIG. 3, with the key member in place and having unlocked the cap member.
Figure 7:
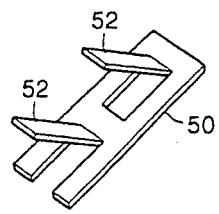
FIG. 7 is an enlarged perspective view of the lock member.
Figure 8:
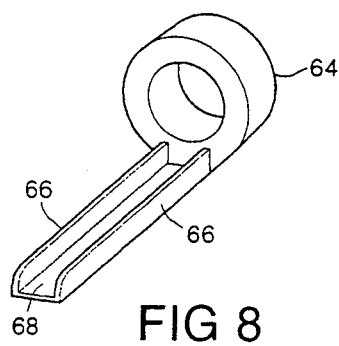
FIG. 8 is an enlarged perspective view of the key member.

As can best be seen in FIG. 1, the gas outlet nozzle 20 is a horizontally disposed elongated structure having a generally tapered shape extending outwardly from the gas outlet base 23. A gas flow control handle 21 is pivotally mounted on the gas outlet base 23 at the top thereof so as to permit control of the flow of natural (or other) gas. The nozzle 20 has a plurality of serrations 22 on the exterior thereof, with these serrations 22 having a back face 26 that is generally perpendicular to the longitudinal axis 28 of the nozzle 20, and having a front face 24 that is angled with respect to the longitudinal axis 28 of the nozzle 22. The manner in which the serrations 22 are angled makes it easier to connect a rubber hose, such as a hose leading to a bunsen burner, onto the nozzle 20 and makes it more difficult to subsequently remove the rubber hose from the nozzle 20.

The cap member 30 has an open first end 31, a generally closed second end 32, and a peripherally disposed main body portion 33. In the preferred embodiment, the cap member 30 is made from a plastic material such as nylon, or the like, and is formed by way of injection molding. The manufacturing process per se, however, is not necessarily important, and would be dictated by manufacturing and cost considerations.

The main body portion 33 has an inner surface 34 defining a frustum shaped nozzle receiving recess 35 and an outer surface 36. The first end 31 of the main body portion 33 is open to provide access to the nozzle receiving recess 35 and the second end 32 of the main body portion 30 is generally closed to preclude access to the nozzle receiving recess 35.

In the preferred embodiment, the peripherally disposed main body portion 33 comprises co-operating inner and outer shells 38 and 40, with the inner shell 38 shaped and dimensioned to fit snugly into the outer shell 40. A guide member 39 extends outwardly from the inner shell 38 and is received in a recess 41 in the outer shell 40 so as to rotationally align the inner and outer shell 38 and 40. The inner and outer shells 38, 40 are preferably sonically welded together, or glued together, so as to securely join them one to the other. The inner shell 38 defines the inner surface 34 of the main body portion 33 and the outer shell 40 defines the outer surface 36 of the main body portion 33.

The inner shell 38 includes a closed end portion 42, and the outer shell 40 includes a closed end portion 44, with the two end portions 42, 44 preferably intimately contacting each other in supporting relation. The closed end portion 42 of the inner shell 38 together with the closed end portion 44 of the outer shell 40, form the generally closed second end 32 of the cap member 30. The first end portion 42 of the inner shell 38 may be shaped and dimensioned to receive a resiliently deformable abutment member 46 therein, which abutment member 46 abuts against the open end of the gas outlet nozzle 20 in sealing relation thereto, so as to preclude the escape of gas therefrom in the event that the gas outlet nozzle 20 is turned on while the cap member 30 is locked in place thereon. In this manner, the cap member 30 of the present invention also acts as a safety gap by precluding gas from being unwantedly discharged from the gas outlet nozzle 30.

A spring metal lock member 50 is mounted in operative relation to the main body portion 33 between the inner shell 38 and the outer shell 40. A shallow indentation 47 is formed in the outer periphery of the inner shell 38, which indentation 47 is shaped and dimensioned to received and retain the lock member 50 therein, in trapped interposed relation between the inner shell 38 and the outer shell 40. The lock member comprises at least one projecting lock portion 52. In the preferred embodiment, there are two projecting lock portions 52 disposed in serial relation one to the other. Each of the projecting lock portions 52 is moveable between a first locking position, as can best be seen in FIG. 3 and a second unlocking position as can best be seen in FIG. 6.

The two projecting lock portion 52 pass through an opening 48 in the inner shell 38, and extend into the nozzle receiving recess 35. The lock member 50 is preferably made from spring metal material, which spring metal material causes the projecting lock portions 52 to be biased to said first locked position. However, suitable plastics having the requisite stiffness and memory characteristics could also be employed.

When the cap member 30 is in place on the gas outlet nozzle 20, the projecting lock portions 52 are each in their first locking position whereat the projecting lock portions 52 each project into the nozzle receiving recess 35 so as to be in interfering relation with one of the plurality of back faces 26 of the respective serrations 22 on the exterior of the gas outlet nozzle 20, so as to thereby lock the cap member 30 in place and preclude the cap member 30 from being removed from the gas outlet nozzle 20.

The cap member 30 further comprises an access passageway 60 in the inner shell 38 of the peripherally disposed main body portion 33. In the preferred embodiment, the access passageway 60 is formed in the inner shell 38, and comprises a pair of parallel slots 62 in the inner shell 38, which slots 62 extend inwardly from the inner face 38a of the inner shell 38. A key member 64 having a pair of flanges 66 and a blade portion 68 disposed between the flanges 66, is shaped and dimensioned to be removably inserted into the access passageway 60 such that the blade portion 68 is initially interposed between the periphery of the gas outlet nozzle 20 and the inner face 38a of the inner shell 38. The flanges 66 are inserted one each into the respective of the slots 62. The slots 62 are, of course, shaped and dimensioned to receive the flanges 66 of a co-operating key member 64 therein. The access passageway 60 is thereby shaped and dimensioned to removably receive the co-operating key member 64 therein, so as to permit access by the key member 64 to the projecting lock portions 52 of the lock member 50. The parallel slots 62 are positioned such that the projecting lock portions 52 of the lock member 50 are disposed therebetween. When the key member 64 is inserted further into the access passageway 60, the blade portion 68 of the key member 64 contacts and thereby moves the projecting lock portions 52 from their first locking position to their second unlocking position, thus permitting the cap member 30 to be removed from the nozzle 20.

Preferably, the key member 64 is made from a metal material but may also be made from a plastic material. The spanning or blade portion 68 of the key member should be about 0.020 inches in thickness in order to fit between the inner shell 38 of the main body portion 33 of the cap member 30 and the periphery of the serrations 22 on the gas outlet nozzle 20, when the cap member 30 is locked in place on the nozzle 20. At the same time, this limited clearance acts so as to preclude other objects, such as bobby pins, from being insertable between the gas outlet nozzle 20 and the cap member 30 in an attempt to release the cap member 30. The flanges 66 of the key member 64 are included so as to give the key member 64 extra strength as the extremely thin blade portion 68 may have very little strength itself.

The cap member 30 may also include a retention strap 37 that is adapted to securely tie the cap member 30 to the gas outlet base 23 and thereby preclude the cap member 30 from becoming lost.

Other modifications and alterations may be used in the design and manufacture of the mechanical security apparatus of the present invention without departing from the spirit and scope of the accompanying claims.

What is claimed is:

1. A cap member for fitment over a gas outlet nozzle having a plurality of serrations on the exterior thereof, said cap member comprising:

a peripherally disposed main body portion having an inner surface and an outer surface, said inner surface defining a nozzle receiving recess;

an open first end;

a generally closed second end;

a lock member mounted in operative relation to said main body portion and having at least one projecting lock portion on said lock member, which lock portion is movable between a first locking position and a second unlocking position;

wherein, when said cap member is in place on said gas outlet nozzle and said at least one projecting lock portion is in said first locking position, said at least one projecting lock portion projects into said nozzle receiving recess so as to be in interfering relation with one of said plurality of serrations on the exterior of said gas outlet nozzle, so as to thereby lock said cap member in place and preclude said cap member from being removed from said nozzle;

wherein, when said cap member is in place on said gas outlet nozzle and said at least one projecting lock portion is in said second unlocking position, said at least one projecting lock portion no longer projects into said nozzle receiving recess so as to no longer be in interfering relation with any of said plurality of serrations on the exterior of said gas outlet nozzle, so as to thereby permit said cap to be removed from said nozzle; and wherein said cap member further comprises an access passageway in said peripherally disposed main body portion, which access passageway is shaped and dimensioned to removably receive a co-operating key member therein, so as to permit access by said key member to said at least one projecting lock portion of said lock member, to thereby allow said key member to contact and thereby move said at least one projecting lock portion from its first locking position to its second unlocking position.

2. The cap member of claim 1, wherein said at least one projecting lock portion is biased to said first locked position.

3. The cap member of claim wherein said 1, wherein said lock member is made from spring metal material.

4. The cap member of claim 2, wherein said at least one projecting lock portion comprises two projecting lock portions disposed in serial relation one to the other such that said key member contacts said projecting lock portions seriatim.

5. The cap member of claim 2, wherein said nozzle receiving recess is frustum shaped.

6. The cap member of claim 2, further comprising a lock member receiving and retaining portion shaped and dimensioned to receive and retain said lock member therein.

7. The cap member of claim 6, wherein said peripherally disposed main body portion comprises co-operating inner and outer shells securely joined one to the other, said inner shell defining said inner surface of said main body portion and said outer shell defining said outer surface of said main body portion with said outer shell having a generally closed second end that forms said generally closed second end of said cap member.

8. The cap member of claim 7, wherein said inner and outer shells are securely joined one to the other at said first end of said main body portion.

9. The cap member of claim 8, wherein said first end is substantially closed off between said inner and outer shells.

10. The cap member of claim 9, wherein said inner and outer shells define a hollow interior therebetween.

11. The cap member of claim 10, wherein said lock member is disposed between said inner and outer shells.

12. The cap member of claim 11, wherein said inner shell comprises an opening therein, said opening being shaped and dimensioned to permit said at least one projecting lock portion to pass therethrough.

13. The cap member of claim 12, wherein said access passageway comprises a pair of parallel slots in said inner shell at said inner surface, said slots shaped and dimensioned to receive therein a corresponding pair of flanges on said key member, and wherein, when said key member is inserted into said access passageway, said at least one projecting lock portion is disposed between said flanges.

14. The cap member of 10, wherein said inner shell has a generally closed second end that, together with said closed second end of said outer shell, form said generally closed second end of said main body portion, and said second end of said inner shell and said second end of said outer shell operatively contact each other.

15. The cap member of claim 1, wherein said main body portion further comprises a lock receiving recess therein in said inner surface, and wherein said lock member is securely retained generally within said lock receiving recess such that said at least one projecting lock portion projects into said nozzle receiving means.

16. The cap member of claim 1, wherein said main body portion is made from a plastic material.

* * * * *